United States Patent [19]
Malaca

[11] Patent Number: 5,107,247
[45] Date of Patent: Apr. 21, 1992

[54] ENGINE WARNING APPARATUS

[76] Inventor: Mike O. Malaca, 2277 Emerson Pl., Fairfield, Calif. 94533

[21] Appl. No.: 504,669

[22] Filed: Apr. 4, 1990

[51] Int. Cl.$^5$ .............................................. B60Q 1/00
[52] U.S. Cl. ..................... 340/449; 340/439; 374/144
[58] Field of Search ............ 340/425.3, 438, 439, 340/449, 584, 643, 457; 374/141, 144, 145; 123/421, 198 D, 198 DC

[56] References Cited

U.S. PATENT DOCUMENTS

| | | |
|---|---|---|
| 4,074,672 | 2/1978 | LaDue et al. ................. 340/449 |
| 4,276,775 | 7/1981 | Provasnik ..................... 374/144 |
| 4,316,175 | 2/1982 | Körber et al. ................. 340/449 |
| 4,495,484 | 1/1985 | Kawakatsu et al. . |

Primary Examiner—Jin F. Ng
Assistant Examiner—Brent A. Swarthout
Attorney, Agent, or Firm—Leon Gilden

[57] ABSTRACT

Apparatus including a plurality of selectively positionable and securable thermal switches selectively positionable within an engine compartment. The switches include clamping ends to secure the switches to spaced terminal blocks in association with electrical circuitry of an associated automobile. Upon completion of a circuit through a thermal switch, an audible horn in association with an optionally utilized warning lamp is actuated to effect warning of a thermal threshold within operation of an associated automobile engine.

1 Claim, 4 Drawing Sheets

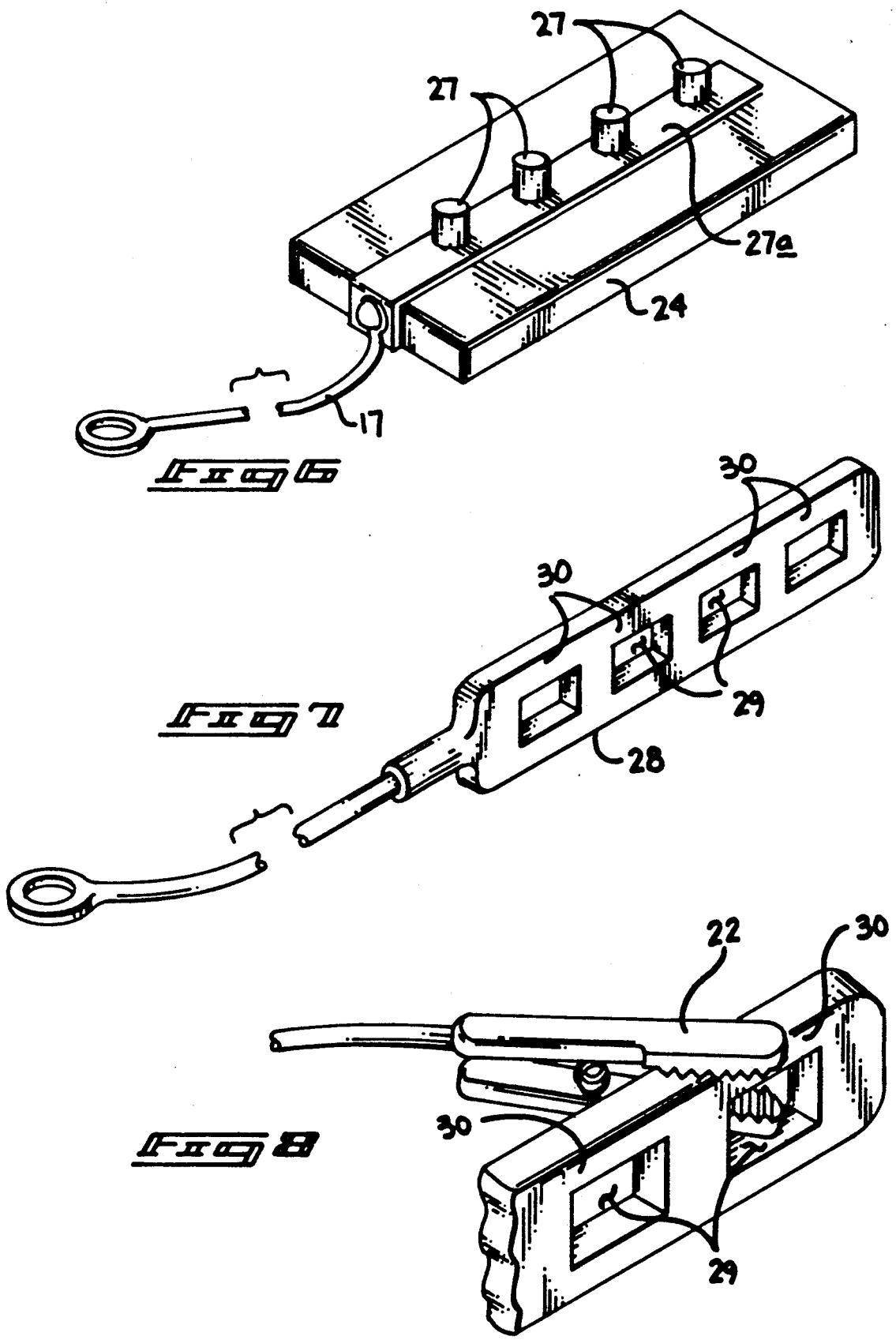

ENGINE WARNING APPARATUS

BACKGROUND OF THE INVENTION

1. Field of the Invention

The field of the invention relates to automotive warning devices, and more particularly pertains to a new and improved engine overheat warning apparatus wherein the same effects an audible warning through selectively positionable switches mounted through an engine compartment.

2. Description of the Prior Art

Various automotive warning devices are utilized throughout the operation of an automobile to effect warning of conditions inconsistent with the safe and efficient use of automobiles. The typical or conventional thermal warning device in association with an automobile is frequently inoperative at temperatures prior to threshold damage to an engine and typically derives input signals from a single positioning within an engine compartment. Examples of the prior art warning devices may be found in U.S. Pat. No. 4,495,484 to Kawakatus wherein a warning device is operative in association with various positions associated with various components of automobiles such as a window, a door, a parking brake and the like.

U.S. Pat. No. 4,361,826 to Catala sets forth a warning device operative with a clutch to indicate proper positioning of a clutch and associated linkage related to transmission members of an automobile.

U.S. Pat. No. 3,815,110 to Davidson sets forth a warning alarm in association with various components undesirably and inadvertently directed in electrical association with a power source.

U.S. Pat. No. 3,903,513 to Green et al sets forth a wheel chair warning system wherein various switches are operated with a seat, brake, and the like in association with a wheel chair to indicate proper positioning of the various components of the wheel chair during use.

As such, it may appreciated that there continues to be a need for a new and improved engine overheat warning apparatus wherein the same is easily and effectively mounted in thermal communication with various engine components and in this respect, the present invention substantially fulfills this need.

SUMMARY OF THE INVENTION

In view of the foregoing disadvantages inherent in the known types of warning apparatus present in the prior art, the present invention provides a new improved engine overheat warning apparatus wherein the same permits convenient and rapid securement to various engine components. As such, the general purpose of present invention, which will be described subsequently in greater detail, is to provide a new and improved engine overheat warning apparatus which has all the advantages of the prior art warning apparatus and none of the disadvantages.

To attain this, the engine overheat warning apparatus of the instant invention includes apparatus including a plurality of selectively positionable and securable thermal switches selectively positionable within an engine compartment. The switches include clamping ends to secure the switches to spaced terminal blocks in association with electrical circuitry of an associated automobile. Upon completion of a circuit through a thermal switch, an audible horn in association with an optionally utilized warning lamp is actuated to effect warning of a thermal threshold within operation of an associated automobile engine.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved engine overheat warning apparatus which has all the advantages of the prior art engine overheat warning apparatuses and none of the disadvantages.

It is another object of the present invention to provide a new and improved engine overheat warning apparatus which may be easily and efficiently manufactured and marketed.

It is a further object of the present invention to provide a new and improved engine overheat warning apparatus which is of a durable and reliable construction.

An even further object of the present invention is to provide a new and improved engine overheat warning apparatus which is susceptible of a low cost of manufacture with regard to both materials and labor, and which accordingly is then susceptible of low prices of sale to the consuming public, thereby making such engine overheat warning apparatuses economically available to the buying public.

Still yet another object of the present invention is to provide a new and improved engine overheat warning apparatus which provides in the apparatuses and methods of the prior art some of the advantages thereof, while simultaneously overcoming some of the disadvantages normally associated therewith.

Still another object of the present invention is to provide a new and improved engine overheat warning apparatus which may be compactly stored when not being utilized.

Yet another object of the present invention is to provide a new and improved engine overheat warning apparatus wherein the same utilizes portable thermal sensors mounted within thermally conductive housings readily and easily securable to various engine components in a surface mount relationship.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of a terminal block utilized by the instant invention.

FIG. 7 is an isometric illustration of a modified terminal block utilized by the instant invention.

FIG. 8 is an isometric illustration of a clamp in association with a thermal switch mounted to the modified terminal block of the instant invention.

DESCRIPTION OF THE PREFERRED EMBODIMENT

Figure 1:
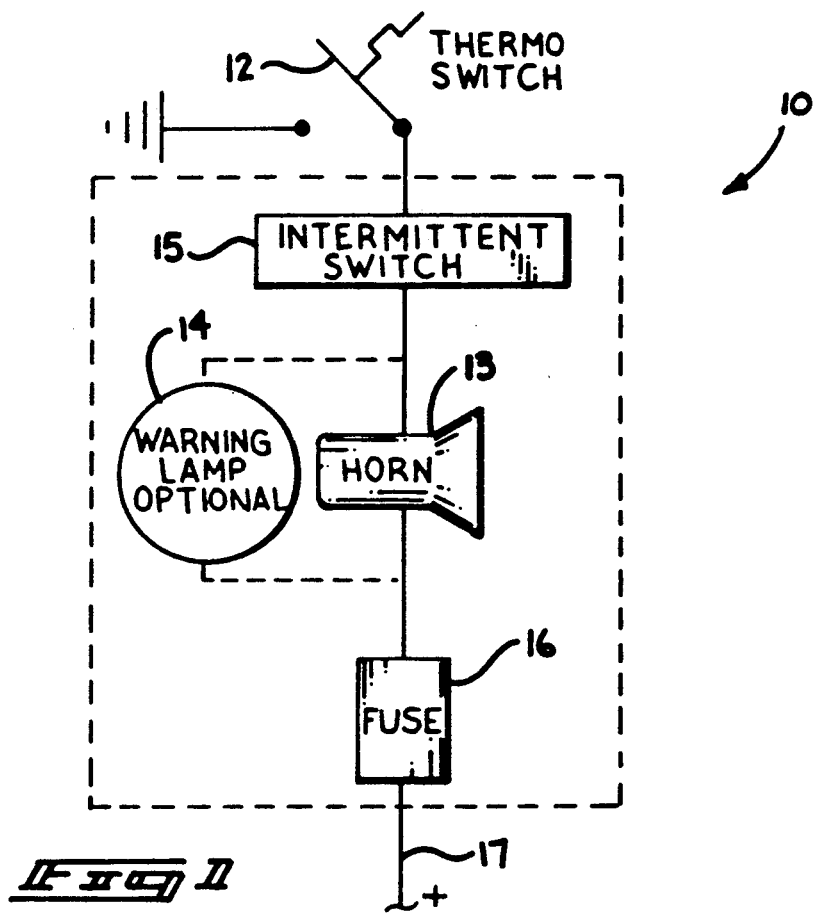
FIG. 1 is a diagrammatic illustration of the instant invention.

With reference now to the drawings, and in particular to FIG. 1 to 8 thereof, a new and improved engine overheat warning apparatus embodying the principles and concepts of the present invention and generally designated by the reference numeral 10 will be described.

More specifically, the engine overheat warning apparatus of the instant invention essentially comprises, an enclosed and sealed housing 11 formed of a thermally conductive metallic material such as aluminum, copper, and the like. As illustrated in FIG. 1, a first thermal switch 12 is in a series electrical communication with a conventional direct current circuit wherein a horn 13 is in operative association with the circuit as well as a reset intermittent switch 15 operative to reset the organization subsequent to the actuation of the horn 13 and an optional warning lamp 14.

Figure 2:
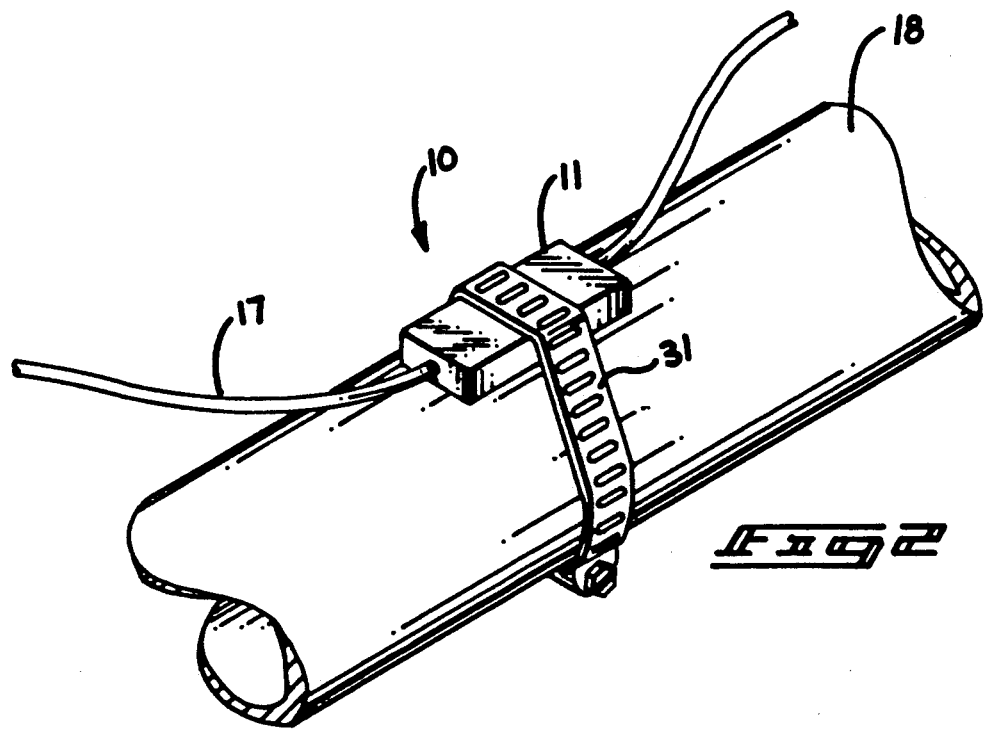
FIG. 2 is an isometric illustration of the instant invention utilizing a thermal switch portably mounted to an engine component.
Figure 3:
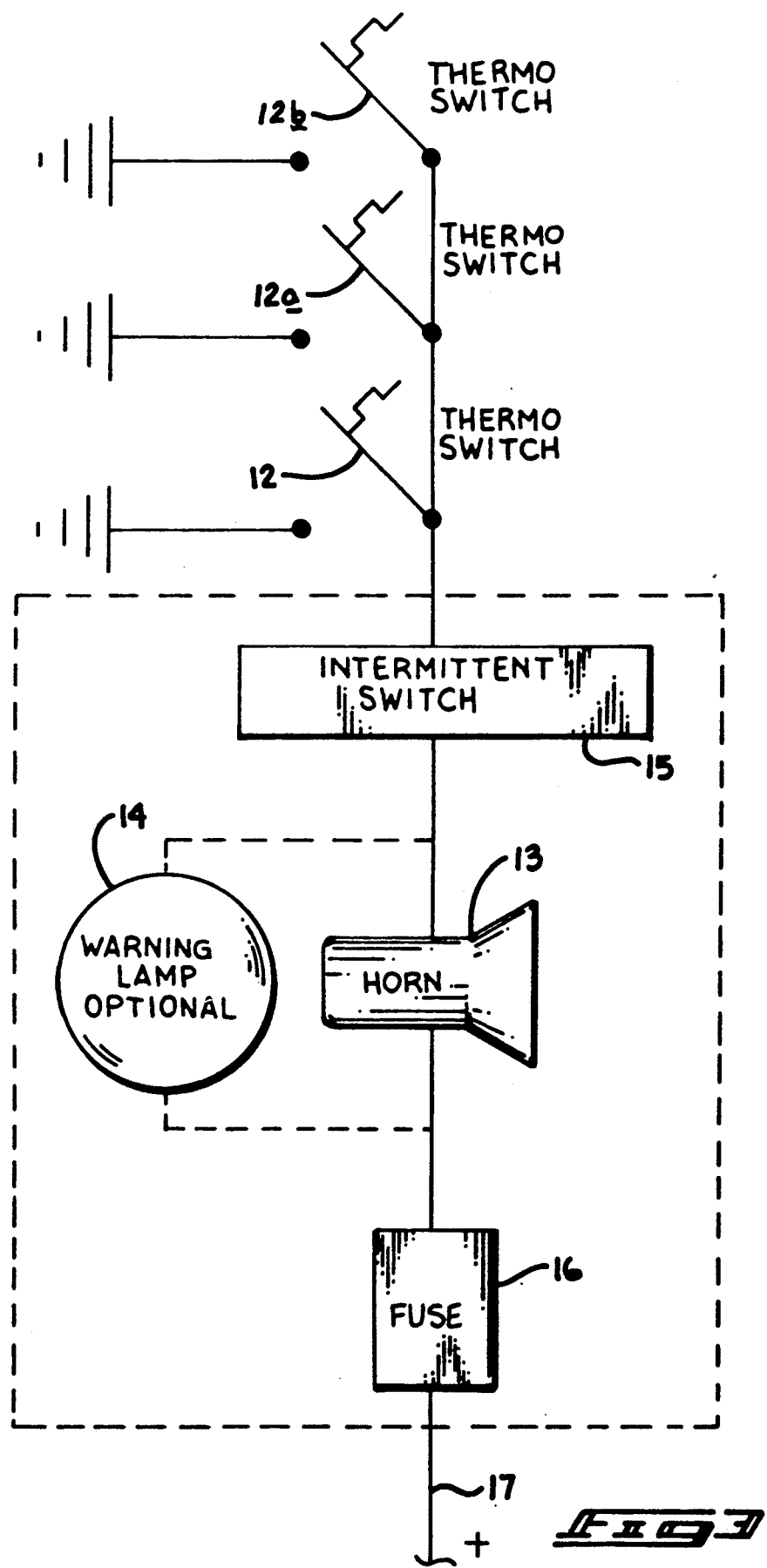
FIG. 3 is a diagrammatic illustration of a series of thermal switches utilized by the instant invention.
Figure 4:
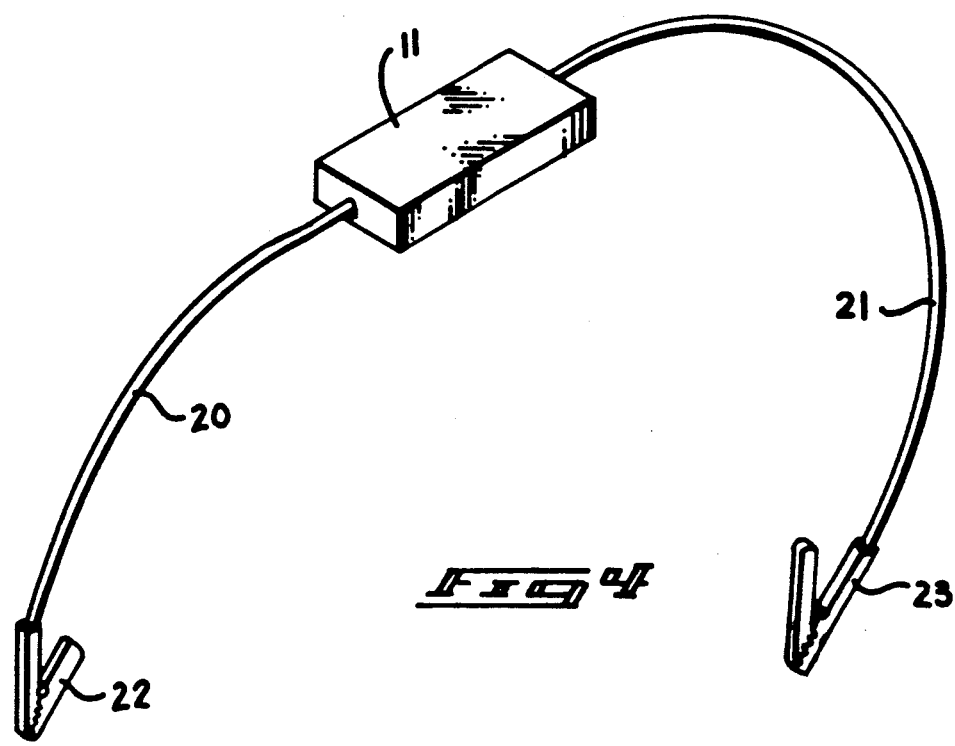
FIG. 4 is an isometric illustration of a typical thermal switch utilized by the instant invention.
Figure 5:
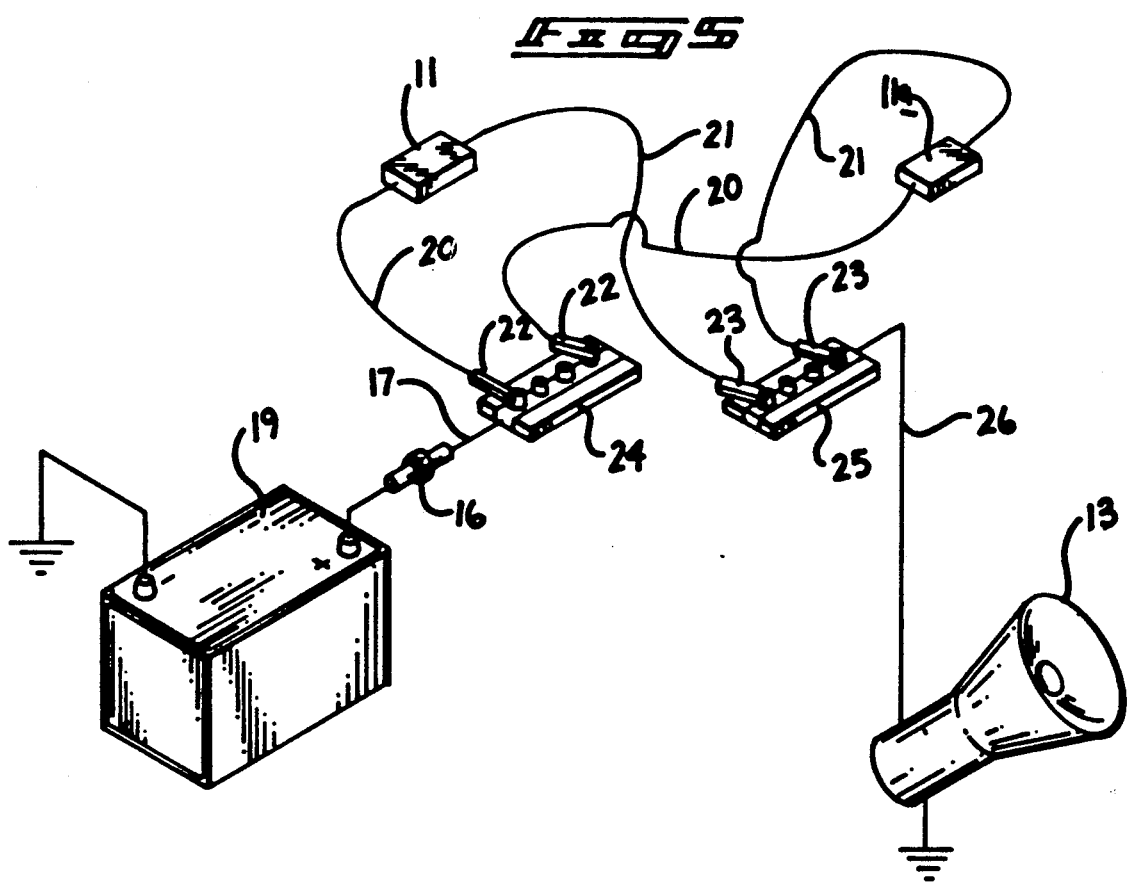
FIG. 5 is an isometric illustration of the instant invention utilizing a plurality of thermal switches in association with an audible warning device.

A fuse 16 is mounted is series with the circuit and is typically of a ten to twenty amperage designation. The electrical transmission line 17 is typically in association with a battery 19, see FIG. 5. FIG. 2 illustrates the use of a circumferential clamp 31 mounted in surrounding relationship to an associated engine component such as a manifold 18 to surface mount the thermal housing 11 and its enclosed thermal switch 12 in direct contiguous association with the manifold 18. Upon the manifold 18 or another engine component such as the engine block, exhaust manifold, and the like attaining a predetermined temperature, the thermal switch 12 will complete the direct current circuit to effect actuation of the horn and warning lamp 13 and 14. FIG. 3 illustrates the use of a plurality of thermal switches comprising a first thermal switch 12, a second thermal switch 12a and a third thermal switch 12b operative in series wherein upon actuation of any of the thermal switches, a complete circuit is effected to actuate the associated horn and warning lamp. The thermal switches enclosed by the thermally conductive housing 11 is illustrated in typical configuration in FIG. 4.

The housing 11 includes a first and a second connector line 20 and 21 respectively with a respective first and second connector line clamp 22 and 23 mounted at a free terminal end of each connector line. The first and second connector line clamps 22 and 23 are mounted to respective first and second terminal block 24 and 25, that are mounted as required throughout the engine compartment. It should be noted that the first connector is mounted to a first connector block while a second connector is mounted to a second connector block to effect completion of an associated circuit upon closing of the associated thermal switch within an associated housing 11, 11a, etc. For FIG. 5, the horn 13 utilizes an electrical output transmission line 26 in association with an electrical input transmission line 17 to effect selective completion of the circuit through the portably mounted housings 11 and 11a.

FIG. 6 illustrates the use of the thermal block utilized by the instant invention wherein the thermal block 24 mounts a single electrical line 17 thereto in association with an electrically conductive transmission strip 27a orthogonally receiving in a fixed manner a series of terminal posts 27 thereon that permit securement of the clamps thereto of the plurality of housings 11 and 11a utilized. FIG. 7 illustrates the use of a modified terminal block defined as an elongate longitudinally aligned plate member including a series of openings 29 therethrough wherein the openings 29 define web strips 30 of a predetermined width. The predetermined width permits a respective connector clamp such as a first connector clamp 22 to receive the web strip 30 therewithin for ease and convenience of securement of the housings as desired. In this manner, the housings may be repositioned throughout the engine compartment as desired by an individual until a satisfactory and optimum positioning is obtained relative to thermal characteristics within each engine compartment.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the part of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows;

1. An engine overheat warning apparatus for selective securement to various components within an engine compartment, the apparatus comprising, a thermal switch selectively securable to one of said engine components, the thermal switch including a first and second connector line electrical association with the thermal switch, and a direct current circuit including a battery in operative association to the first connector line, and the second connector line effecting completion of the direct current circuit through the thermal switch, and an audible alarm in electrical communication with the direct current circuit to effect actuation of the audible alarm upon closure of the thermal switch, and wherein the thermal switch includes a thermally conductive metallic housing in surrounding and sealed relationship about the thermal switch, and the first and second electrical connector lines directed through the housing exteriorly thereof, and wherein the first connector line includes a first clamp member, and the second connector line includes a second clamp member, and the first clamp member includes a first pair of jaws generally biased and in closed position and the second clamp member includes a second pair of jaws biased and generally in closed position, and the direct current circuit includes a first terminal block and a second terminal block wherein the first clamp member is secured to the first terminal block and the second clamp member is secured to the second terminal block, and including a further thermal switch and a further electrically conductive housing formed in a sealed relationship about the further thermal switch, and a third connector line and a fourth connector line mounted in electrical series through the further housing, and the third connector line including a third clamp and the fourth connector line including a fourth clamp wherein the third clamp is mounted to the first connector block and the fourth clamp is mounted to the second connector block wherein closure of either the first or the second thermal switch effects actuation of the audible alarm, and wherein the first terminal block and the second terminal block include a block member with a connective strip mounted overlying the block member, and a series of terminal posts orthogonally mounted to the strip wherein the terminal posts receive one of said clamp members thereabout, and wherein each terminal block is defined by a longitudinally aligned plate member, the plate member including a series of opening directed therethrough, the openings define web strips of a predetermined thickness between the openings and a perimeter edge of each terminal block, wherein the web is generally defined by a predetermined thickness, and each of the clamp members accommodate the predetermined thickness therewithin to permit securement of a selective clamp member to a selective web strip of an associated terminal block.

* * * * *